US012618552B2

(12) United States Patent
Villareal

(10) Patent No.: US 12,618,552 B2
(45) Date of Patent: May 5, 2026

(54) GLOWING TILE ASSEMBLY

(71) Applicant: Jorge Villareal, Houston, TX (US)

(72) Inventor: Jorge Villareal, Houston, TX (US)

( * ) Notice: Subject to any disclaimer, the term of this patent is extended or adjusted under 35 U.S.C. 154(b) by 4 days.

(21) Appl. No.: 19/017,393

(22) Filed: Jan. 10, 2025

(65) Prior Publication Data

US 2025/0224110 A1 Jul. 10, 2025

Related U.S. Application Data

(60) Provisional application No. 63/619,382, filed on Jan. 10, 2024.

(51) Int. Cl.

| | |
|---|---|
| ***F21V 33/00*** | (2006.01) |
| ***F21S 8/00*** | (2006.01) |
| ***F21V 19/04*** | (2006.01) |
| ***F21V 23/00*** | (2015.01) |
| *F21Y 101/00* | (2016.01) |
| *F21Y 115/10* | (2016.01) |

(52) U.S. Cl.

CPC ............ *F21V 33/006* (2013.01); *F21S 8/032* (2013.01); *F21V 19/04* (2013.01); *F21V 23/009* (2013.01); *F21Y 2101/00* (2013.01); *F21Y 2115/10* (2016.08)

(58) Field of Classification Search

CPC .... F21Y 2115/10; F21V 23/009; F21V 19/04; F21V 33/006; F21S 8/032

See application file for complete search history.

(56) References Cited

U.S. PATENT DOCUMENTS

| | | | | |
|---|---|---|---|---|
| 11,976,425 B1 * | 5/2024 | Khlyzov | ............... | F21V 33/006 |
| 2014/0111993 A1 * | 4/2014 | Bertin | ................... | F21V 17/101 362/249.02 |

FOREIGN PATENT DOCUMENTS

| | | | | |
|---|---|---|---|---|
| DE | 10256300 A1 * | 8/2004 | .............. | F21V 31/00 |
| DE | 202007002610 U1 * | 4/2007 | .............. | F21V 31/04 |
| EP | 2372039 A1 * | 10/2011 | ............ | F21V 33/006 |
| FI | 120009 B * | 5/2009 | ........... | F24D 13/024 |
| JP | H11175014 A * | 7/1999 | ............. | G09F 19/22 |

OTHER PUBLICATIONS

Innovation Q+ NPL Search (Year: 2025).*

* cited by examiner

*Primary Examiner* — Anabel Ton

(74) *Attorney, Agent, or Firm* — Law Office of Jeff Williams PLLC; J. Oliver Williams

(57) ABSTRACT

A glowing tile assembly includes a metal frame having opposing rolled edges to form a cavity for the acceptance of an LED. Tile is configured to be laid or set upon a flat base of the frame. The opposing rolled edges are adjacent the tile. An LED is located within the cavity configured to emit a light to a side of tile. A lip is formed on an exterior of the rolled edges and is configured to allow grout to pack under the lip and remain in contact with the tile.

9 Claims, 2 Drawing Sheets

GLOWING TILE ASSEMBLY

CROSS REFERENCE TO RELATED APPLICATIONS

This application claims the benefit of an earlier filing date and right of priority to U.S. Provisional Application No. 63/619,382, filed 10 Jan. 2024, the contents of which is incorporated by reference herein in its entirety.

BACKGROUND OF THE INVENTION

1. Field of the Invention

The present application relates to a tiling product, and more particularly to an assembly for securing lighting within a pattern of tile.

2. Description of Related Art

Tile is a common floor and wall covering used in many residential and commercial applications. Tile serves to provide a hard and waterproof surface that is highly durable to heavy traffic and is waterproof. These attributes make it highly desirable for applications such as flooring in high traffic areas, bathrooms, and kitchens. Tile has a varied external pattern that is natural with the tile itself or that can be printed onto the tile to help with aesthetic appearances.

When tile is applied to a substrate, typically a layer of mortar or thin set is applied to the substrate following the application of tile on top of that. Grout is applied between the tiles to solidify the tile and is colored to assist in visual accenting. The application process completely covers the substrate. The tile may be made from various materials, such as ceramic and glass for example. Any lighting is external. The application process generally limits the ability to have backlighting shine through the tile. It is desired that tile assembly be developed which allows for embedded lighting to be applied behind the tile so as to give a back light appearance to further accentuate the visual aesthetic appeal.

BRIEF SUMMARY OF THE INVENTION

It is an object of the present application to a glowing tile assembly configured to provide a method for attaching tile to a substrate while simultaneously permitting for the illumination of light behind the tile so as to provide visual aesthetic appeal to an individual. It is understood that tile configured to permit the transfer of light is a ideally suited for the assembly of the present application.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
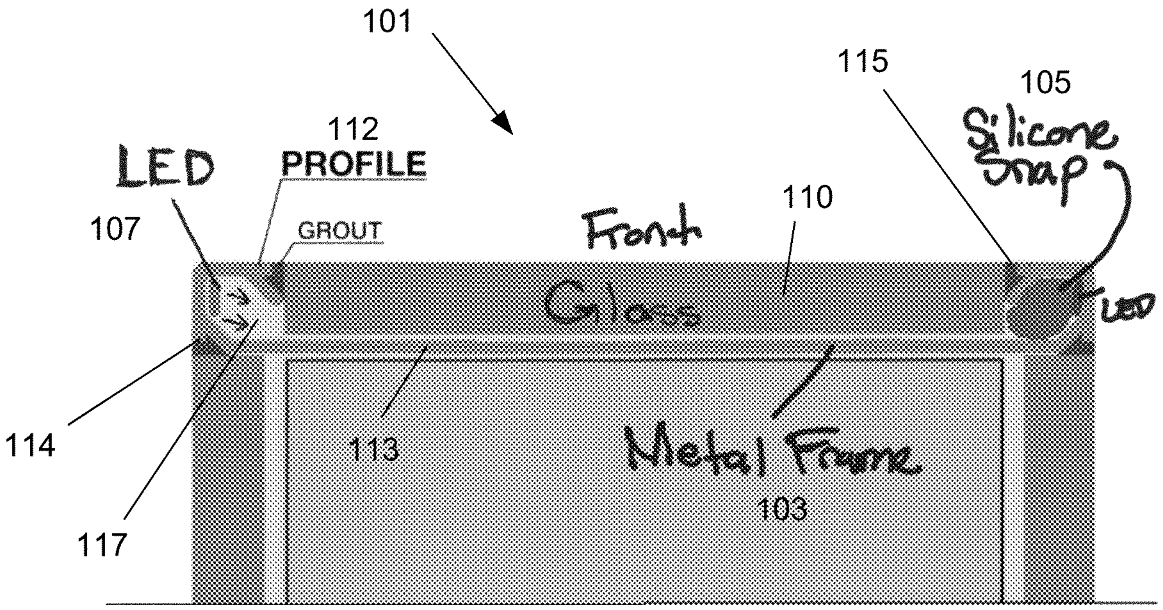
FIG. 1 is a side view of a glowing tile assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a glowing tile assembly 101 is illustrated. Glowing tile assembly 101 includes a metal frame 103, a silicone strap 105, and LED 107. Metal frame 103 provides a structural framework to support tiles 110. Frame 103 may include one or more elevated edges or tabs designed to permit routing of additional components. Tiles 110 are configured to be set within frame 103 (i.e. glass). Frame 103 is shown extending under and around to the sides of tile 110. Frame 103 is a track having a flat base 113 configured to be laid upon a substrate or wall. A tile 110 is configured to be set onto the flat base 113. Frame 103 also includes opposing rolled edges 112 to generate a curved profile. A cavity 117 is formed at each rolled edge. The cavity 117 is open to the flat base 113 so as to allow light to exit the cavity 117 and reach tile 110.

Figure 2:
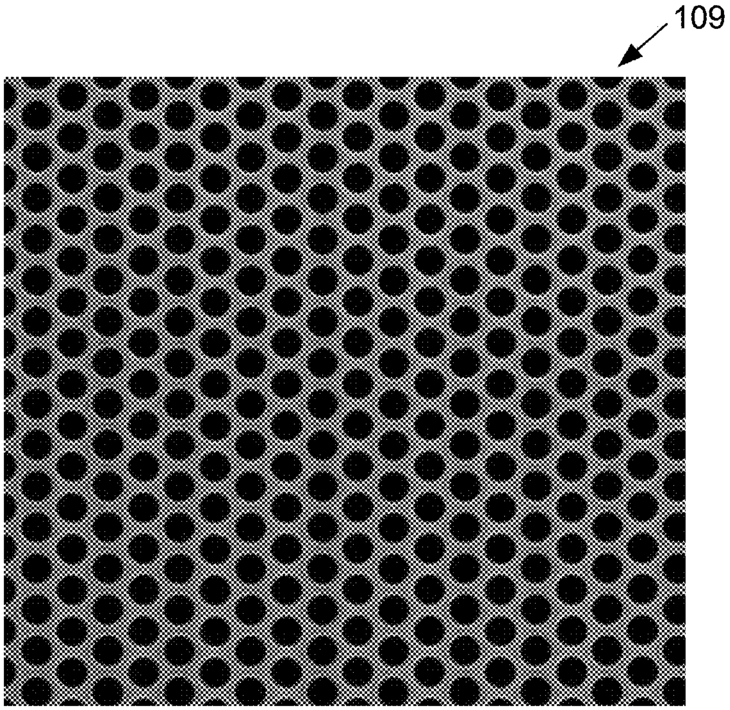
FIG. 2 is a top view of a mesh used in the flowing tile assembly of FIG. 1.
Figure 3:
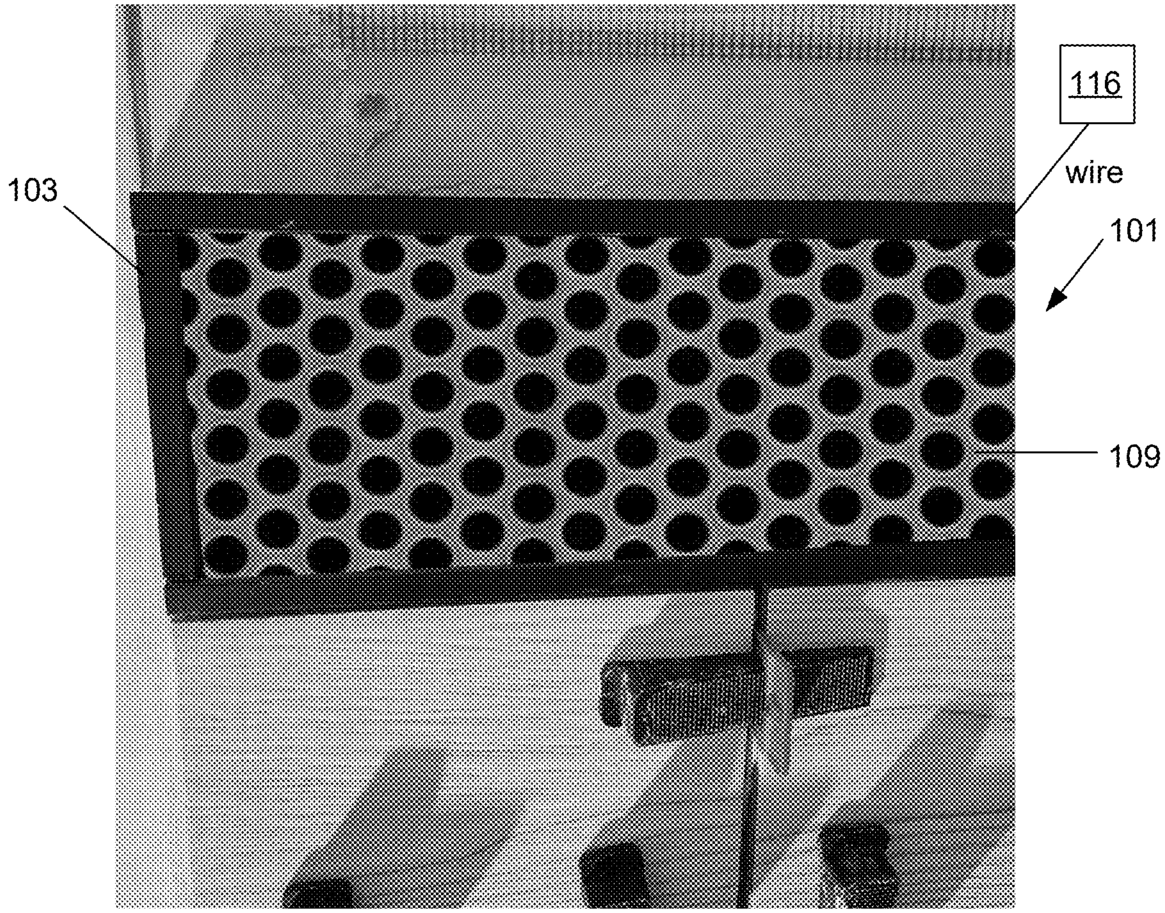
FIG. 3 is a top view of the glowing tile assembly of FIG. 1 on a substrate adjacent neighboring tiles.

Referring now also to FIGS. 2 and 3 in the drawings, a mesh 109 associated with frame 103 is illustrated. In operation metal frame 103 is configured to be adhered to a selected substrate with mortar. Mesh includes a surface having one or more apertures configured to engage and set within a layer of mortar. Mortar is configured to pass through mesh 109 so as to also adhere portions of tile 110. Mesh 109 is configured to be located along a lower portion of frame 103. Frame 103 extends around tile 110 to permit the location of LED lighting. In FIG. 3, the frame 103 and mesh 109 are shown on a substrate for setting adjacent to other preset tiles on the same substrate.

Referring back to FIG. 1 in the drawings, a LED 107 is located within a portion of frame 103. LED 107 is configured to selectively emit light rays into portions of frame 103. Frame 103 is configured to reflect portions of the light rays from LED 107 so as to direct those light rays behind the tile and through the sides thereof. The emitted light rays act to illuminate the tile such that the relatively transparent tile has the effect of glowing. It is understood that any number of LED's 107 may be used in assembly 101. Also, LED 107 is ideally located outside of the tile and rely on reflecting light rays to cover the backside and sides of the tile.

A silicone strap may be located adjacent LED 107 and within a corner or edge of frame 103. It is understood that an external visual profile of assembly 101 may include frame 103 around one or more edges of tile with grout between frame 103 and tile 110. Rolled edges 112 includes lips 114/115 configured to protrude from the exterior of the rolled edge to allow grout to pack under it and remain in contact with tile 110.

It is understood that assembly 101 may be linked wherein multiple units of frame 103 may be joined together to provide various illuminated designs on a substrate. LED 107 may be transferred from or through frame 103 of the multiple units so as to link them all together. LED 107 may include one or more individual LED lights or light strands that may be electrically connected so as to operate on and off with a single switch or controller 116.

It is understood that a layer of silicone strapping 105 may be used within the edge of frame 103. Frame 103 is configured to and close a internal cavity where an LED 107 is located. Silicone strap 105 may be used to fill that cavity so as to protect LED's 107. Ideally it is understood that silicone may be transparent so as to permit the continued emitting of light rays to pass through to reach tile 110. Silicone 105 may be used to help adhere tile 110 two frame 103.

A feature of assembly 101 is to provide the capability of routing LED 107 along the internal cavities of frame 103 either prior to or after the setting of tile 110 end of frame 103. In operation a user may replace LED 107 and interchange it with another style or design thereby permitting different colors and functions of the lights. It is also understood that the electrical nature of LED 107 is protected from moisture through the use of grout and silicone strap 105. This allows LED 107 to remain dry despite the various environmental factors that influence tile 110. It is also understood that a controller may be used in communication with LED 107 and may be coupled to a portion of frame 103. This may be seen wherein the controller may be mounted inside a wall or beneath the substrate accessible through an external panel.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A glowing tile assembly, comprising:

a frame having a flat base and opposing rolled edges, the rolled edges form a cavity, the cavity open to the flat base;

a tile set within the flat base;

an LED located within the cavity configured to emit a light to a side of tile; and a lip on an exterior of the rolled edges configured to allow grout to pack under the lip and remain in contact with the tile.

2. The assembly of claim 1, wherein the flat surface includes apertures.

3. The assembly of claim 1 wherein the frame is made from metal.

4. The assembly of claim 1, wherein the tile is made of glass.

5. The assembly of claim 1, further comprising:

a controller to operate the LED.

6. A glowing tile assembly, comprising:

a frame having a flat base and opposing rolled edges, the rolled edges form a cavity, the cavity open to the flat base;

a tile set within the flat base;

a set of LEDs located within the cavity configured to emit a light to a side of tile;

a controller to operate the set of LEDs; and a lip on an exterior of the rolled edges configured to allow grout to pack under the lip and remain in contact with the tile.

7. The assembly of claim 6, wherein the flat surface includes apertures.

8. The assembly of claim 6, wherein the frame is made from metal.

9. The assembly of claim 6, wherein the tile is glass.

* * * * *